United States Patent [19]
Sakai et al.

[11] Patent Number: 5,935,039
[45] Date of Patent: Aug. 10, 1999

[54] NON-FINITE SPEED CHANGE RATIO TRANSMISSION DEVICE

[75] Inventors: Hiromasa Sakai, Yokosuka; Motoharu Nishio, Yokohama, both of Japan

[73] Assignee: Nissan Motor Co., Ltd., Yokohama City, Japan

[21] Appl. No.: 09/035,730

[22] Filed: Mar. 5, 1998

[30] Foreign Application Priority Data

Mar. 10, 1997 [JP] Japan ................................ 9-054856

[51] Int. Cl.⁶ .............................................. F16H 61/00
[52] U.S. Cl. .............................. 476/10; 477/37; 476/41
[58] Field of Search ........................ 477/37–39; 476/10, 476/40, 41; 475/183, 192, 216, 217

[56] References Cited

U.S. PATENT DOCUMENTS

| | | | |
|---|---|---|---|
| 4,846,765 | 7/1989 | Sakai | 477/39 X |
| 5,099,710 | 3/1992 | Nakano | 476/41 X |
| 5,308,298 | 5/1994 | Lambert | 476/10 |
| 5,683,326 | 11/1997 | Inoue | 476/10 |
| 5,711,741 | 1/1998 | Inoue | 476/10 |
| 5,779,591 | 7/1998 | Inoue | 476/10 X |

FOREIGN PATENT DOCUMENTS 6-101754  4/1994  Japan .

*Primary Examiner*—Khoi Q. Ta
*Attorney, Agent, or Firm*—Foley & Lardnner

[57] ABSTRACT

The same rotation torque is input to a continuously variable transmission of a vehicle which continuously varies a speed change ratio and a reduction gear unit. A planetary gear mechanism is provided comprising an output shaft which varies a rotation direction according to a relation between the output speed of the continuously variable transmission and the output speed of the reduction gear unit. The continuously variable transmission varies the speed change ratio according to an oil pressure balance between two oil chambers. A direction change-over valve selectively supplies a first oil pressure and a second oil pressure to these oil chambers, and a control valve controls a differential pressure of the first oil pressure and second oil pressure. The control range of the differential pressure controlled by the control valve is narrowed due to reversal of the oil pressure supply direction by the direction change-over valve according to whether the vehicle is moving forward or in reverse, and control precision is thereby improved.

5 Claims, 7 Drawing Sheets

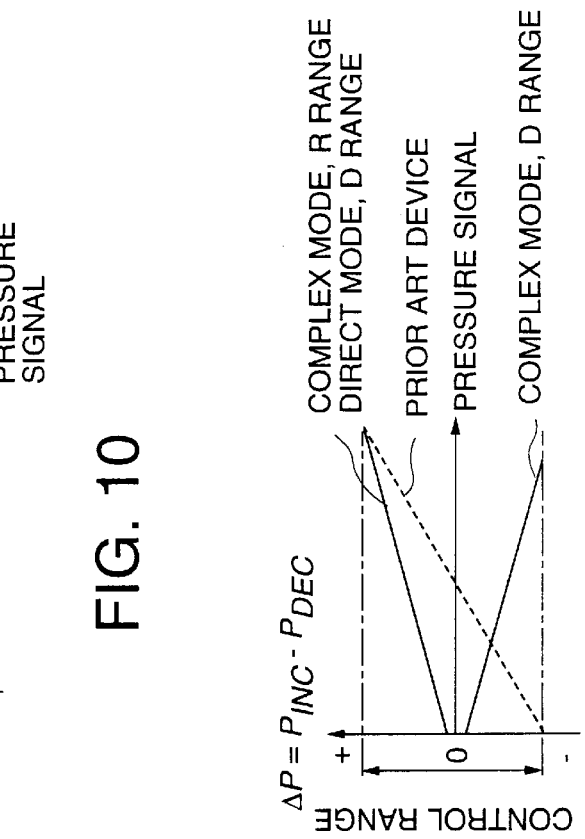
FIG. 11
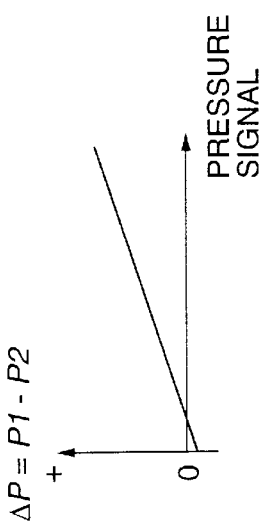
FIG. 10
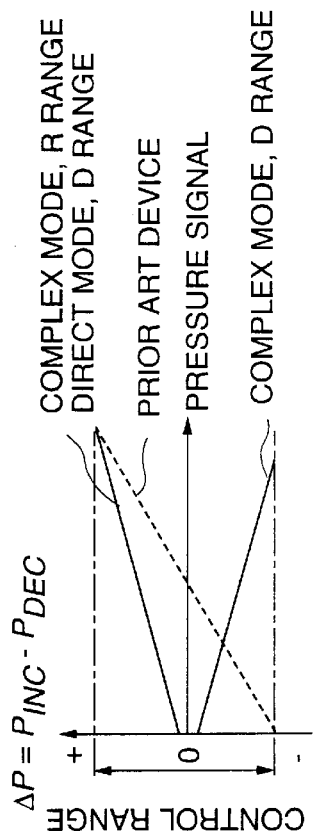
FIG. 6
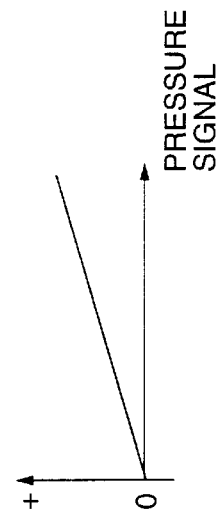
FIG. 5
| | P1 | P2 |
|---|---|---|
| DIRECT MODE (R) | $P_{INC}$ | $P_{DEC}$ |
| COMPLEX MODE (D) | $P_{DEC}$ | $P_{INC}$ |
| DIRECT MODE (D) | $P_{INC}$ | $P_{DEC}$ |
FIG. 7

NON-FINITE SPEED CHANGE RATIO TRANSMISSION DEVICE

The contents of Tokugan Hei 9-54856, with a filing date of Mar. 10, 1997 in Japan, are hereby incorporated by reference.

FIELD OF THE INVENTION

This invention relates to control of a speed change device comprising a toroidal type continuously variable transmission and a planetary gear mechanism.

BACKGROUND OF THE INVENTION

Tokkai 6-101754 published by the Japanese Patent Office in 1995 discloses a non-finite speed change ratio continuously variable transmission comprising a continuously variable transmission and a planetary gear mechanism, for enlarging a speed change region of the continuously variable transmission (CVT) of a vehicle.

In this device, an engine output is input to a toroidal type continuously variable transmission and a reduction gear unit.

The output shaft of the continuously variable transmission is joined to a sun gear of the planetary gear mechanism, and the output shaft of the reduction gear unit is joined to a carrier of planet gears of the planetary gear mechanism via a power circulation clutch. A ring gear of the planetary gear mechanism is joined to a drive shaft driving the vehicle wheels, and the output shaft of the continuously variable transmission is also joined to the drive shaft through a direct clutch.

This device has two power transmission modes, i.e. a direct drive mode in which the direct clutch is connected and the power circulation clutch is disconnected, and a complex mode in which the direct clutch is connected and the power circulation clutch is disconnected.

In the direct mode, the engine output is transmitted to the drive shaft via the continuously variable transmission.

In the complex mode, a rotation of the ring gear stops when the sun gear which is rotated by the output of the reduction gear unit and the rotation of the planet carrier which is rotated by the output of the continuously variable transmission, are balanced. This state is a "neutral state" wherein a rotation torque is not transmitted to the ring gear and the drive shaft connected thereto.

In this case, the ratio of the engine rotation speed and the rotation speed of the drive shaft is infinity.

If the speed change ratio of the continuously variable transmission in this state is a neutral speed change ratio, the rotation direction of the ring gear varies depending on whether the speed change ratio of the continuously variable transmission is larger or smaller than the neutral speed change ratio. The vehicle is made to move forwards or reverse from rest by making the speed change ratio of the continuously variable transmission vary towards larger or smaller from the neutral speed change ratio.

When the vehicle is moving forwards and the speed change ratio of the continuously variable transmission arrives at a predetermined region, the power circulation clutch is cut off and the direct clutch is connected. Due to this, a change-over occurs from the complex drive mode to the direct drive mode. When the speed change ratio is at a higher speed than this region, in the direct drive mode, the output of the continuously variable transmission is directly transmitted to the drive shaft.

Therefore according to this speed change-over device, a change-over between all running states including forward and reverse from rest and high speed can be made smoothly without using a torque converter.

The speed change ratio of a toroidal type continuously variable transmission is made to vary by displacing trunnions which support power rollers due to oil pressure. More specifically, an oil pressure is applied to both ends of a piston joined to each of the shafts of the trunnions, and the trunnions are displaced due to this differential pressure. This differential pressure is controlled by a solenoid which responds to a duty signal transmitted by a control unit, and a spool valve which responds to a signal pressure generated according to the energization of the solenoid.

The differential pressure acting on the piston is reversed when the direction of travel of the vehicle is reversed, and this also occurs when there is a change over between the complex mode and the direct mode.

This reversal of differential pressure requires a large variation of oil pressure and makes oil pressure control complicated. Also, the duty ratio of the oil pressure control signal needs to be maintained between forward and reverse in order to maintain a neutral state. At such a duty ratio, oil pressure vibration may occur. This oil pressure vibration causes the output shaft of the transmission to vibrate, and is a factor responsible for generating noise.

Further, when there is a scatter in the signal pressure generated due to energization of the solenoid, it causes scatter in the differential pressure. Due to this scatter, the trunnion may be maintained in a biased position either to the forward or reverse side of the completely neutral state, and a small forward or reverse drive force may therefore act on the vehicle.

As this drive force is small, it can be controlled by operating the brakes, but it still gives the driver an uncomfortable sensation.

SUMMARY OF THE INVENTION

It is therefore an object of this invention to easily perform oil pressure control of a continuously variable transmission device having a non-finite speed change ratio.

It is a further object of this invention to suppress generation of noise in the continuously variable transmission device.

It is yet another object of this invention to easily maintain a neutral state of the continuously variable transmission device.

In order to achieve the above objects, this invention provides a non-finite speed change ratio transmission device for a vehicle, comprising a toroidal type continuously variable transmission which transmits a rotation force via a power roller gripped between an input disk and an output disk at a continuously varying speed change ratio according to a gyration angle change of the power roller in response to a differential pressure between a first oil chamber and a second oil chamber, a reduction gear unit for reducing a rotation torque identical to that of the input disk by a predetermined ratio, and a planetary gear mechanism having an output shaft whereof the rotation direction varies according to a relation between a rotation output speed of the continuously variable transmission and a rotation output speed of the reduction gear unit.

The device further comprises an operating mechanism for selecting one of forward motion and reverse motion of the vehicle, a direction selecting valve for supplying a first oil pressure to the first oil chamber and supplying a second oil pressure to the second oil chamber when the forward motion is selected, and supplying the second oil pressure to the first oil chamber and the first oil pressure to the second oil chamber when the reverse motion is selected, and a control valve for controlling a differential pressure between the first oil pressure and the second oil pressure.

It is preferable that the control valve has a function for controlling the differential pressure so that the first oil pressure is not less than the second oil pressure.

This invention also provides a non-finite speed change ratio transmission device for a vehicle, comprising a toroidal type continuously variable transmission which transmits a rotation force via a power roller gripped between an input disk and an output disk at a continuously varying speed change ratio according to a gyration angle change of the power roller in response to a differential pressure between a first oil chamber and a second oil chamber, a reduction gear unit for reducing a rotation torque identical to that of the input disk by a predetermined ratio, a planetary gear mechanism comprising a sun gear joined to an output shaft of the continuously variable transmission, a planet carrier joined to an output gear of the reduction gear unit via a first clutch and a ring gear, a final output shaft joined to the output shaft of the continuously variable transmission via a second clutch, and a mode selector valve for selecting either of a complex mode wherein the first clutch is engaged and the second clutch is released, and a direct mode wherein the second clutch is engaged and the first clutch is released, by operating the first and second clutch via control of oil pressure supplied thereto.

The device further comprises an operating mechanism for selecting one of forward motion and reverse motion of the vehicle, a direction selecting valve for supplying a first oil pressure to the first oil chamber and supplying a second oil pressure to the second oil chamber when the forward motion is selected, and supplying the second oil pressure to the first oil chamber and the first oil pressure to the second oil chamber when reverse motion is selected, and a control valve for controlling a differential pressure between the first oil pressure and the second oil pressure.

It is preferable that the device further comprises a valve which, when the direct mode is selected, supplies the first oil pressure to the first oil chamber and supplies the second oil pressure to the second oil chamber.

It is further preferable that the control valve has a function for controlling the differential pressure so that the first oil pressure is not less than the second oil pressure.

The details as well as other features and advantages of this invention are set forth in the remainder of the specification and are shown in the accompanying drawings.

BRIEF DESCRIPTION OF THE DRAWINGS

FIG. 5 is a diagram showing a relation between a solenoid signal pressure and a differential pressure controlled by a control valve in the transmission device.

FIG. 6 is a diagram showing a relation between a solenoid output and a differential pressure in oil chambers $P_{INC}$–$P_{DEC}$ in the transmission device.

FIG. 7 is a comparison chart between a first oil passage pressure P1 and a second oil passage pressure P2 of the transmission device.

FIG. 10 is a diagram showing a relation between a solenoid output and a control differential pressure of control valve according to the second embodiment.

FIG. 11 is a diagram showing a relation between a solenoid signal pressure and a differential pressure $P_{INC}$–$P_{DEC}$ according to the second embodiment.

DESCRIPTION OF THE PREFERRED EMBODIMENTS

Figure 1:
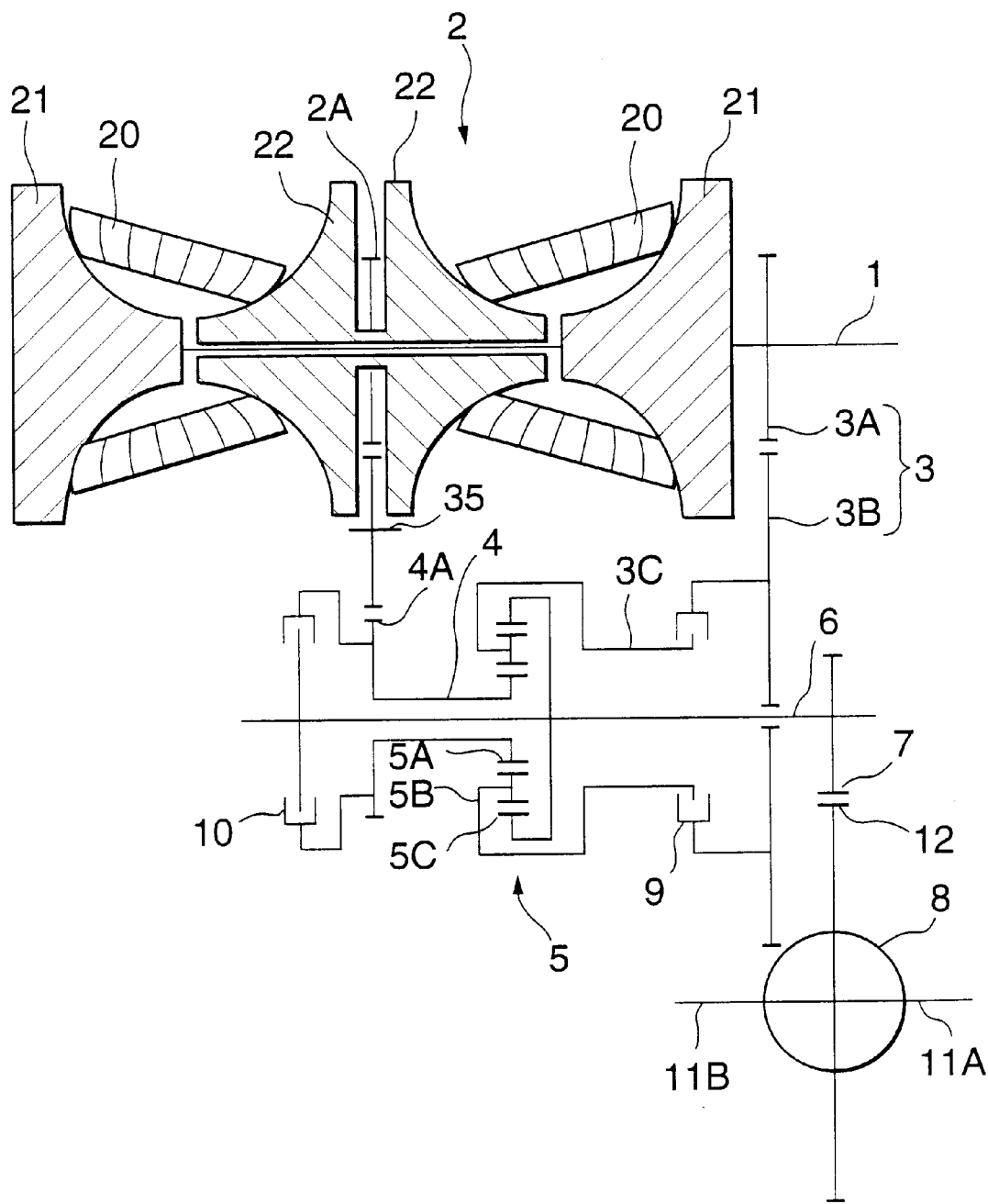
FIG. 1 is a schematic diagram of a transmission device according to this invention.

Referring to FIG. 1 of the drawings, a non-finite speed change ratio continuously variable transmission device comprises an input shaft 1, a toroidal type continuously variable transmission (CVT)2, reduction gear unit 3, planetary gear mechanism 5 and final output shaft 6.

The CVT 2 comprises an input disk 21 and output disk 22, and a plurality of power rollers 20 fitted between the input disk 21 and output disk 22. The input disk 21 is joined to the input shaft 1. A rotation of the output disk 22 is transmitted to the transmission output shaft 4 via an output gear 2A, counter gear 35 and gear 4A.

Figure 2:
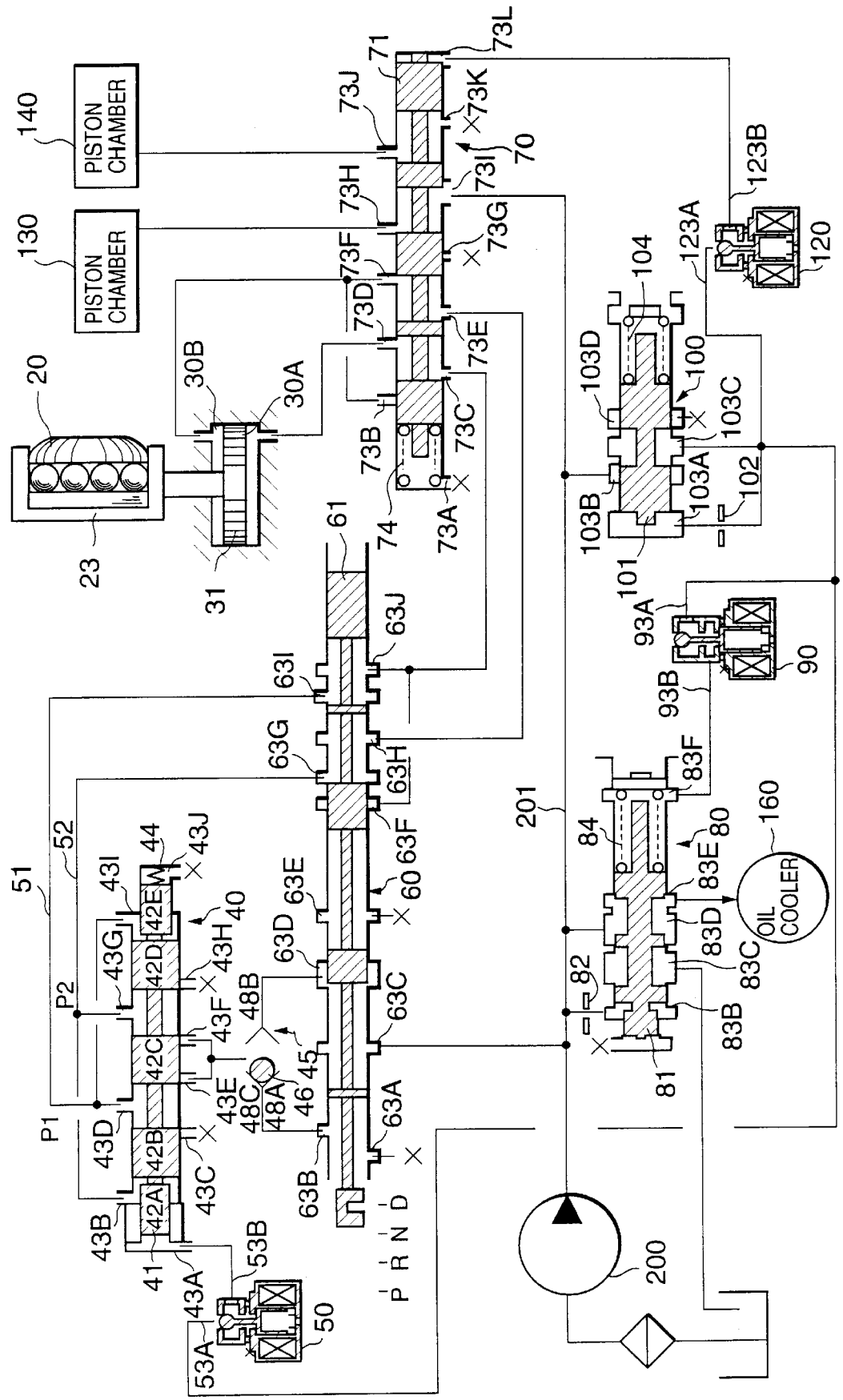
FIG. 2 is a schematic diagram of an oil pressure circuit of the transmission device.

The power roller 20 is supported by a trunnion 23 shown in FIG. 2. A piston 31 is fixed to the trunnion 23. The trunnion 23 is displaced according to a differential pressure between oil chambers 31A and 30B formed on both sides of the piston 31, and causes a gyration angle of the power roller 20 to vary. Due to the change of gyration angle of this power roller 20, a rotation ratio transmitted to the output disk 22 from the input disk 21, i.e. a speed change ratio, is made to vary continuously.

Specifically, the output shaft 4 of the transmission 2 is joined to a sun gear 5A of the planetary gear mechanism 5. It is also joined to the final output shaft 6 via a direct clutch 10.

The direct clutch 10 corresponds to the second clutch in the claims.

A reduction gear unit 3 comprises gears 3A, 3B and an output shaft 3C which rotate together with the input shaft 1. The gear 3A is made to engage with the gear 3B, and the gear 3B is joined to the gear output shaft 3C via a power circulation clutch 9. The power circulation clutch 9 corresponds to the first clutch in the claims.

The gear output shaft 3C is joined to a planet carrier 5B supporting planet gears of the planetary gear mechanism 5.

A ring gear 5C of the planetary gear mechanism 5 is joined to the final output shaft 6.

A rotation of the final output shaft 6 is transmitted to the drive wheels 11A, 11B of the vehicle via the transmission output gear 7, a final gear 12 and a differential gear 8.

An oil pressure circuit of this continuously variable transmission device will now be described referring to FIG. 2.

The oil pressure circuit is provided with a control valve 40, manual valve 60 linked to a shift lever not shown, power transmission mode selector valve 70, pressure regulator 80, line pressure solenoid 90, pilot valve 100, mode change-over solenoid 120 and oil pump 200. The control valve 40, manual valve 60, power transmission mode selector valve 70, pressure regulator 80 and pilot valve 100 are spool valves which are operated by a signal pressure except the manual valve 60 which is operated manually.

An oil passage (referred to hereafter as line pressure passage) 201 connected to a discharge port of an oil pump 200 is connected to a supply port 83D of a pressure regulator 80, and is also connected to a feedback port 83B via an orifice 82.

The oil pressure of an output port 93B of the line pressure solenoid 90 is led to a signal pressure port 83F of the pressure regulator 80. A spring 84 which elastically supports a spool 81 in the same direction as the signal pressure is housed in the inside of the pressure regulator 80. A port 83E of the pressure regulator 80 is connected to an oil cooler 160, and a drain port 83C is connected to an inlet of the oil pump 200 via a tank.

The pressure regulator 80 displaces the spool 81 according to the pressure of the signal pressure port 83F so as to generate a line pressure according to a signal pressure input from the line pressure solenoid 90.

A supply pressure port 103B of a pilot valve 100 is connected to the line pressure passage 201. A control pressure port 103C of the pilot valve 100 is connected to a supply pressure port 123A of the mode change-over solenoid 120, supply pressure port 53A of the control valve control solenoid 50 and supply pressure port 93A of the line pressure solenoid 90. The control pressure port 103C is also connected to a feedback port 103A which drives a spool 101 of the pilot valve 100 via an orifice 102. The spool 101 is elastically supported against the pressure in the feedback port 103A by a spring 104.

The pilot valve 100 reduces the line pressure generating a constant pressure which balances the spring 104, and this is supplied to the supply pressure ports of the solenoids 50, 90 and 120.

The manual valve 60 is the only manually operated valve in this oil pressure circuit. The line pressure of the line pressure passage 201 is led to the line pressure port 63C of the manual valve 60. The manual valve 60 is provided with a D range port 63D and an R range port 63B. Line pressure supplied by the line pressure port 63C is supplied to either the D range port 63D or R range port 63B according to the position of a manually operated spool 61. The port 63D is connected to a port 48B of a shuttle valve 45, and the port 63B is connected to a port 48A of the shuttle valve 45. The shuttle valve 45 comprises a ball 46 which responds to a pressure difference between the ports 48A and 48B. The pressure of the port at higher pressure is output to the control pressure port 48C.

The manual valve 60 is provided with ports 63G, 63I, 63F, 63H to supply an oil pressure P1 of a first oil passage 51 connected to the control valve 40 and an oil pressure P2 of a second oil passage 52 selectively to piston chambers 30A and 30B driving the piston 31 according to the speed change range selected manually by the shift lever.

The first oil passage 51 is connected to the port 63I. The second oil passage 52 is connected to the port 63G. The oil pressure P1 corresponds to the first oil pressure in the claims, and the oil pressure P2 corresponds to the second oil pressure in the claims.

The manual valve 60 is also provided with drain ports 63E, 63A which are open to the atmosphere.

The control valve 40 is provided with a supply pressure port 43A connected to an output pressure port 53B of the control valve control solenoid 50 and supply pressure ports 43E, 43F connected to a supply pressure port 48C of the shuttle valve 45. A control pressure port 43D connected to the first oil passage 51 and a control pressure port 43G connected to the second oil passage 52, are provided. Also provided are a feedback port 43I which causes the pressure of the control pressure port 43D to act on the spool 41 as a feedback pressure, and a feedback port 43B which causes the pressure of the control pressure port 43G to act on the spool 41 as a feedback pressure. Drain ports 43C, 43H and 43J are provided which are open to the atmosphere.

The control valve 40 generates a differential pressure between the control pressure ports 43D, 43G according to the displacement of a spool 41. A spring 44 which elastically supports the spool 41 against the pressure of the supply pressure port 43A is provided at one end of the control valve 40, and the spool 41 comprises edges 42A, 42E and lands 42B–42D.

The edge 42A separates the signal pressure port 43A and feedback port 43B. The edge 42E separates the port 43J and feedback port 43I.

The land 42B connects the control pressure port 43D to the drain port 43C according to a displacement of the spool 41 due to a pressure drop of the signal pressure port 43A. The land 42C connects the control pressure port 43D to the supply pressure port 43E according to a displacement of the spool 41 due to a pressure increase of the signal pressure port 43A. The control pressure port 43G is connected to the supply pressure port 43F according to a displacement of the spool 41 due to a pressure drop of the signal pressure port 43A. The land 42D connects the control pressure port 43G to the drain port 43H according to a displacement of the spool 41 due to a pressure increase of the signal pressure port 43A.

The diameters of the edges 42A and 42E are equal. The diameters of the lands 42B, 42C and 42D are also equal, and are larger than the diameters of the edges 42A, 42E.

A power transmission mode selector valve 70 comprises a spool 71 which responds to a signal pressure generated by the change-over solenoid 120. This signal pressure acts on the spool 71 via a signal pressure port 73L formed on one edge of the power transmission mode selector valve 70. A spring 74 which elastically supports the spool 71 in a direction opposite to that of the signal pressure is provided on the opposite edge of the power transmission mode selector valve 70.

The power transmission mode selector valve 70 is provided with ports 73A–73K in addition to the signal pressure port 73L.

The drain port 73A, 73G and 73K are connected to the atmosphere.

The port 73C is connected to ports 63F, 63J of the manual valve 60, and the port 73E is connected to a port 63H. The torque decrease port 73D is connected to the piston chamber 30A, the torque increase ports 73B, 73F are connected to the piston chamber 30B, and the port 73I is connected to the line pressure passage 201 as described hereabove.

The power circulation clutch 9 is provided with a piston chamber 130 for connecting and disconnecting the clutch, and the direct clutch 10 is provided with a piston chamber 140 for connecting and disconnecting the clutch.

The power circulation port 73H of the power transmission mode selector valve 70 is connected to the piston chamber 130, and the direct clutch port 73J is connected to the piston chamber 140.

The power transmission mode selector valve 70 connects the port 73C to the torque increase port 73B or the torque decrease port 73D, and connects the port 73E to the torque decrease port 73D or the torque increase port 73F according to a displacement of the spool 71 in response to signal pressure in the signal pressure port 73L.

The power circulation port 73H is connected to the port 73I or drain port 73G, and the direct clutch port 73J is connected to the drain port 73K or port 73I.

In FIG. 2, the manual valve 60 is set to the D range (forward range).

In this state, line pressure is supplied to the D range port 63D. In the D range, the ball 46 of the shuttle valve 45 is on the side of the port 48A, and the ports 48B, 48C are connected. Line pressure is led to the supply pressure ports 43E, 43F of the control valve 40. The control valve 40 is in a neutral position, these supply pressure ports 43E, 43F being closed by the land 42C.

When the duty ratio of the control valve control solenoid 50 is increased to increase signal pressure, the spool 41 is displaced to the right-hand side of the figure. As a result, the ports 43E and 43D are connected, line pressure is supplied to the port 43D, and the oil pressure P1 of the first oil passage 51 increases. The drain ports 43H, 43G are connected, the port 43G is opened to a drain, and the oil pressure P2 of the second oil passage 52 falls. The differential pressure $\Delta P=P1-P2$ therefore increases.

Conversely, when the duty ratio of the control valve control solenoid 50 is decreased to 0 so as to decrease the signal pressure from this neutral position, the spool 41 is displaced it to the left-hand side of the figure. As a result, the ports 43F and 43G are connected, line pressure is supplied to the port 43G, and the oil pressure P2 of the second oil passage 52 rises. The ports 43C, 43D are also connected, the port 43D is opened to the drain, and the oil pressure P1 of the first oil passage 51 falls. The differential pressure $\Delta P=P1-P2$ therefore becomes slightly negative.

In this way, the differential pressure between the oil pressure P1 of the first oil passage 51 and oil pressure P2 of the second oil passage 52 can be made to vary according to the increase and decrease of signal pressure via the control valve control solenoid 50. When the duty ratio of the control valve control solenoid 50 is equal to or greater than a predetermined small value, the differential pressure $\Delta P$ is positive, and when the duty ratio is less than the predetermined small value, it becomes slightly negative.

When the D range is selected, the port 63G of the manual valve 60 is connected to the port 63H, and the port 63I is connected to the port 63J. Therefore, the oil pressure P1 of the first oil passage 51 is led to the port 63J, and the oil pressure P2 of the second oil passage 52 is led to the port 63H.

In FIG. 2, an output port 123B of the mode change-over solenoid 120 is shut off from the supply pressure port 123A, and signal pressure is not generated.

In this state, the spool 71 of the power transmission mode selector valve 70 is situated near to the signal pressure port 73L due to the spring 74. This connects the direct clutch port 73J to the drain port 73K, and the power circulation clutch port 73H to the supply pressure port 73I. The direct mode clutch 10 of the transmission device is therefore released, and replaced by the complex mode in which the power circulation clutch 9 is engaged. Also, the port 73C to which the oil pressure P1 is led is connected to the port 73D connected to the oil chamber 30A, and the port 73E to which the oil pressure P2 is led is connected to the port 73F connected to the oil chamber 30B. Consequently, the oil pressure P1 acts on the oil chamber 30A, and the oil pressure P2 acts on the oil chamber 30B.

Hence, when the forward range D is selected in the complex mode, the differential pressure $P_{INC}-P_{DEC}$ between the oil chambers 30A, 30B is the reverse P2–P1 of the differential pressure $\Delta P=P1-P2$ controlled by the control valve 40, and the characteristics of the differential pressure of the oil chambers 30B, 30A, are the inverse of the characteristics of FIG. 5, as shown in FIG. 6.

In this state, the rotation speed of gear output shaft 3C of the reduction gear unit 3 is higher than the rotation speed of the transmission output shaft 4 of the continuously variable transmission 2 for a given torque input to the input shaft 1, and the ring gear 5C of the planetary gear mechanism 5 rotates in the forward direction.

To maintain this state, if the differential pressure $\Delta P=P1-P2$ is controlled to lie within a positive range, the duty ratio of the control valve control solenoid 50 may be maintained equal to or greater than a predetermined small value. In this range, when the duty ratio of the control valve control solenoid 50 is increased, the differential pressure of the oil chambers 30B, 30A becomes large, and the piston 31 is displaced in a direction such as to reduce the speed change ratio of the continuously variable transmission 2.

If the duty ratio of the control valve control solenoid 50 is controlled to a predetermined small value such that the differential pressure $\Delta P$ is 0 in FIG. 6, the spool 41 of the control valve 40 is kept in the neutral position shown in FIG. 2, and the transmission device remains in the neutral state when the vehicle moves forward.

Figure 3:
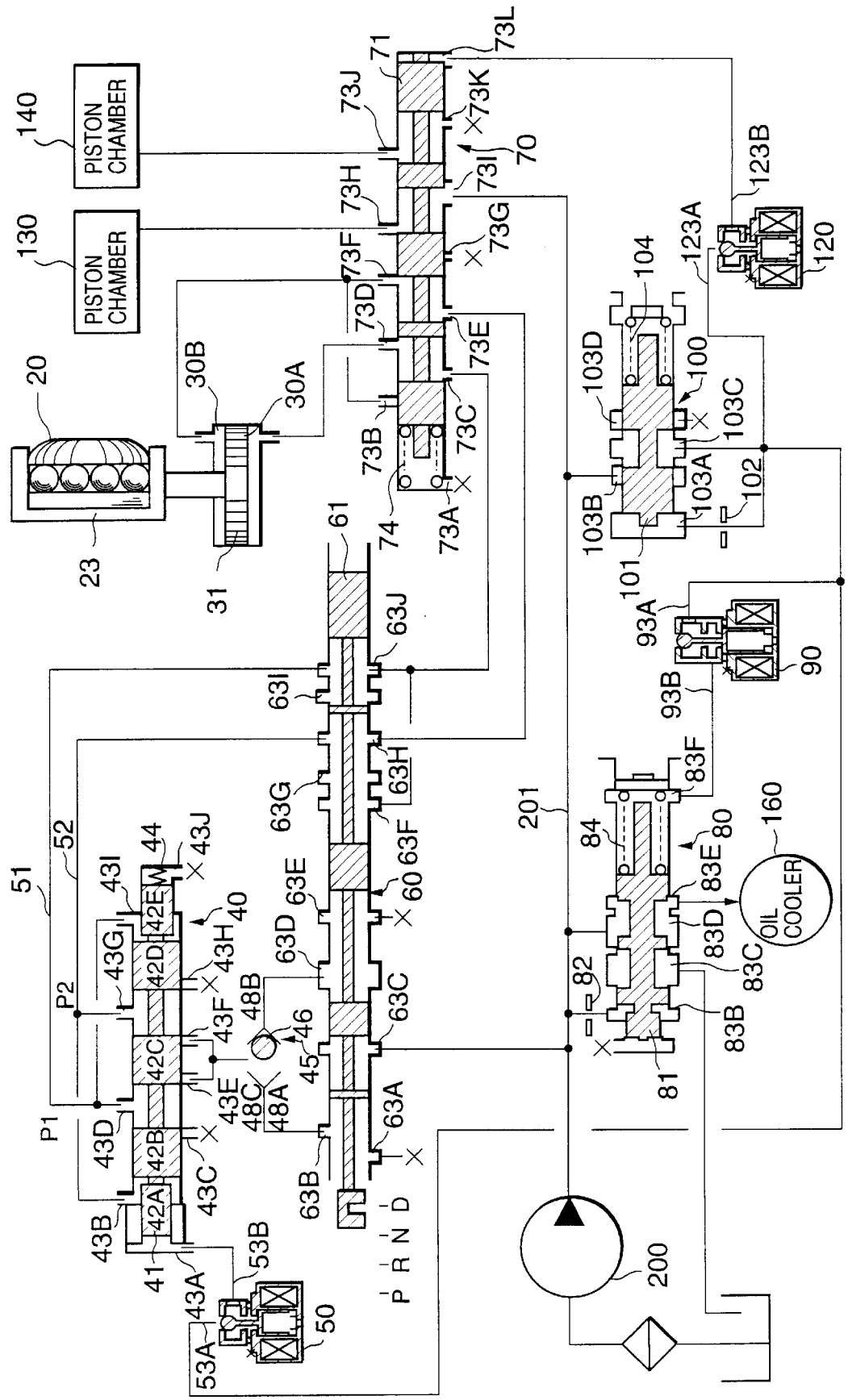
FIG. 3 is a diagram of an oil pressure circuit showing a connection state of an oil passage in a reverse range of a complex mode of the transmission device.

The situation when reverse motion is selected in the complex mode will now be described with reference to FIG. 3.

When the manual valve 60 is changed to the reverse range R position, the port 63C is connected to the R range port 63B, the ball 46 of the shuttle valve 45 is on the side of the port 48B, and line pressure is led to the supply pressure ports 43E, 43F of the control valve 40 in the same way as when the vehicle is moving forward. The control valve 40 controls the differential pressure P1–P2 between the oil pressure P1 of the first oil passage 51 and the oil pressure P2 of the second oil passage 52 to lie within a positive range according to the signal pressure from the control valve control solenoid 50, as when the vehicle is moving forward.

On the other hand, in the manual valve 60, the port 63G is connected to the port 63F, and the port 63I is connected to the port 63H. Consequently, the oil pressure P1 of the first oil passage 51 is led to the port 63H, and the oil pressure P2 of the second oil passage 52 is led to the port 63F. The spool 71 of the power transmission mode selector valve 70 is maintained in the complex mode as in the case of FIG. 2. As a result, the oil pressure P1 acts on the oil chamber 30B and the oil pressure P2 acts on the oil chamber 30A which is opposite to the case of forward motion.

When the reverse range is selected, in the complex mode, the differential pressure $P_{INC}-P_{DEC}$ of the oil chambers 30B, 30A is equal to the differential pressure $\Delta P=P1-P2$ controlled by the control valve 40 as shown in FIG. 6. In this state, the rotation speed of the transmission output shaft 4 of the continuously variable transmission 2 is higher than the rotation speed of the gear output shaft 3C of the reduction gear unit 3 for a given input torque to the input shaft 1. As a result, the ring gear 5C of the planetary gear mechanism 5 rotates in the reverse direction.

To maintain this state, the differential pressure $\Delta P=P1-P2$ may be controlled to lie within a positive range. This is the same as when the forward range D is selected in the complex mode. In this range, when the duty ratio of the control valve control solenoid 50 is increased, the differential pressure between the oil chambers 30B, 30A becomes large, and the piston 31 is displaced in such a direction as to reduce the speed change ratio of the continuously variable transmission 2.

By controlling the duty ratio of the control valve control solenoid 50 to a the predetermined small value such that the differential pressure ΔP in FIG. 6 is 0, the spool 41 of the control valve 40 is kept in the neutral position, and the transmission device is maintained in a neutral state when the vehicle reverses.

Figure 4:
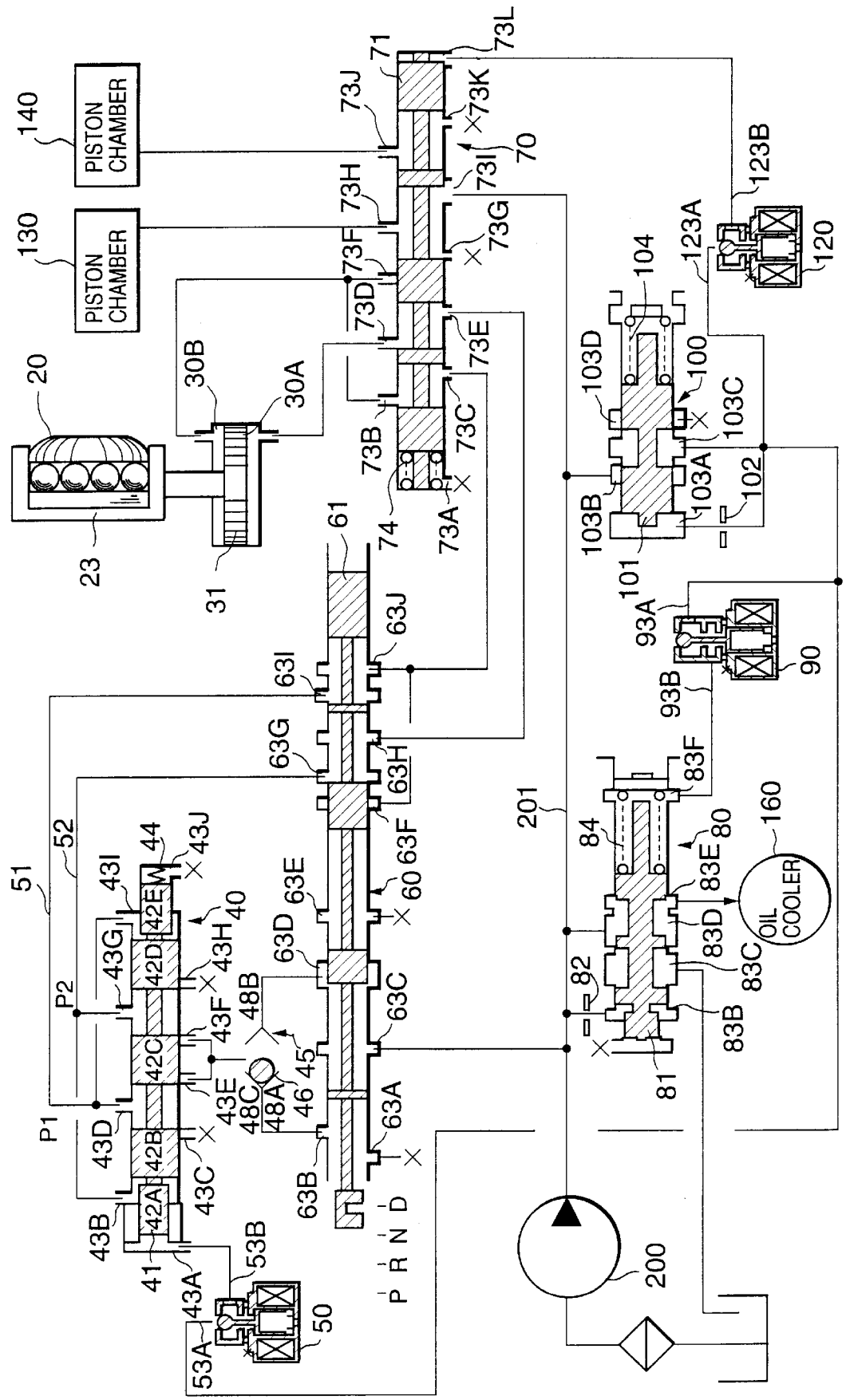
FIG. 4 is a diagram of an oil pressure circuit showing a connection state of an oil passage in a direct mode of the transmission device.

Next, referring to FIG. 4, the operation of the transmission device will be described when the forward range D is selected in the direct mode.

In this case also, the position of the spool 61 of the manual valve 60 is the same as when the range D is selected in the complex mode. The port 63G is connected to the port 63H, and the port 63I is connected to the port 63J. Therefore, the oil pressure P1 of the first oil passage 51 is led to the port 63J, and the oil pressure P2 of the second oil passage 52 is led to the port 63H.

In the direct mode, the output pressure port 123B of the mode change-over solenoid 120 is connected to the supply pressure port 123A, and a high signal pressure acts on the signal pressure port 73L of the power transmission mode selector valve 70.

The spool 71 therefore moves towards the drain port 73A against the force of the spring 74, the direct clutch port 73J is connected to the supply pressure port 73I, and the power circulation clutch port 73H is connected to the drain port 73G. Due to this, the direct clutch 10 is engaged, and the power circulation clutch 9 is released.

The port 73C to which the oil pressure P1 was led is connected to the port 73B connected to the oil chamber 30B, and the oil pressure P1 acts on the oil chamber 30B. The port 73E to which the oil pressure P2 was led is connected to the port 73D connected to the oil chamber 30A, and the oil pressure P2 acts on the oil chamber 30A. This is the same as when the reverse range R is selected in the complex mode.

The control valve 40 functions in the same way as in the case of the complex mode, the differential pressure ΔP=P1–P2 of the oil pressure P1 of the first oil passage 51 and the oil pressure P2 of the second oil passage 52 being controlled according to the duty ratio of the control valve control solenoid 50.

The differential pressure P1–P2 is maintained within a positive range by controlling this differential pressure ΔP to lie above a predetermined small value within a positive range. Therefore, in the direct mode, the differential pressure $P_{INC}$–$P_{DEC}$ of the oil chambers 30B, 30A is equal to the differential pressure ΔP=P1–P2 controlled by the control valve 40.

These characteristics are the same as when the reverse range R is selected in the complex mode as shown in FIG. 6.

When the vehicle is moving forward in the direct mode, and a torque is input to the input shaft 1, the torque of the transmission output shaft 4 of the continuously variable transmission is directly output to the final output shaft 6 of the transmission device via the direct clutch 10.

To maintain this state, the duty ratio of the control valve control solenoid 50 is maintained equal to or greater than a predetermined small value. When the duty ratio of the control valve control solenoid 50 is increased within this range, the differential pressure $P_{INC}$–$P_{DEC}$ of the oil chambers 30B and 30A increases, and the piston 31 is displaced in a direction such as to reduce the speed change ratio of the continuously variable transmission 2.

FIG. 7 summarizes the behavior of the oil pressure $P_{INC}$ of the oil chamber 30B and the oil pressure $P_{DEC}$ of the oil chamber 30A for various combinations of selection range and operation mode.

Figure 8:
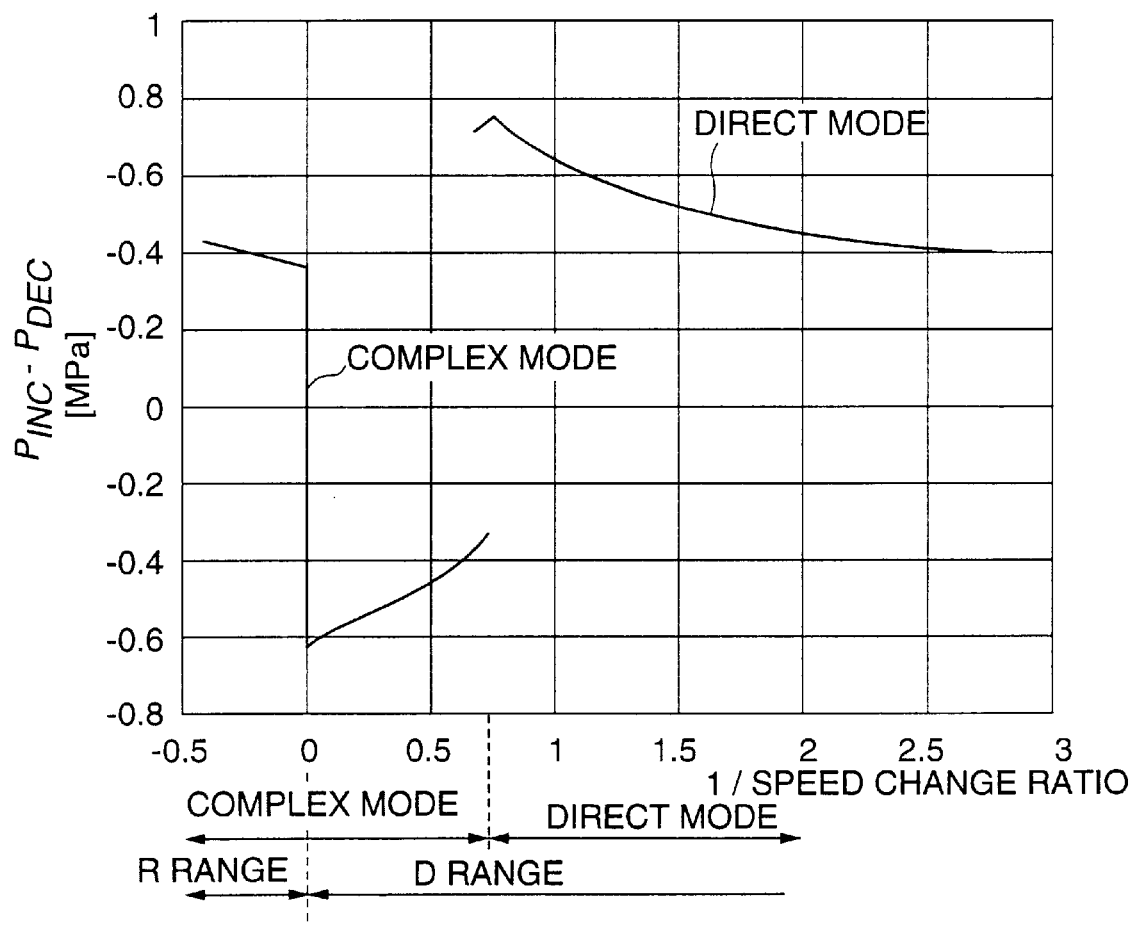
FIG. 8 is a diagram showing a variation of the differential pressure $P_{INC}$–$P_{DEC}$ according to a speed change state in the two modes of the transmission.

FIG. 8 shows the relation between the differential pressure $P_{INC}$–$P_{DEC}$ and the speed change ratio for each mode and range of the continuously variable transmission device.

As discussed hereinabove, in this continuously variable transmission device, by controlling the duty ratio of the control valve control solenoid 50 to be equal to or greater than a predetermined small value, all operation modes and selection ranges can be covered. Also, as the differential pressure ΔP=P1–P2 is limited to a positive range and a slightly negative range, the gain of the differential pressure ΔP relative to the signal pressure input to the control valve 40 can be suppressed. The gain of the differential pressure ΔP relative to the signal pressure in a prior art device is approximately 2 times that of the gain of the transmission according to this invention as shown by the dotted line of FIG. 6. Reducing the gain in this way makes it easier to control the oil pressure.

It is possible not to provide the port 43F of the control valve 40. If this arrangement is adopted, the line pressure is not supplied to the port 43G regardless of the position of the spool 41, and the differential pressure ΔP=P1–P2 can be maintained within a positive range even when the duty ratio of the control valve control solenoid 50 is less than a predetermined small value.

Figure 9:
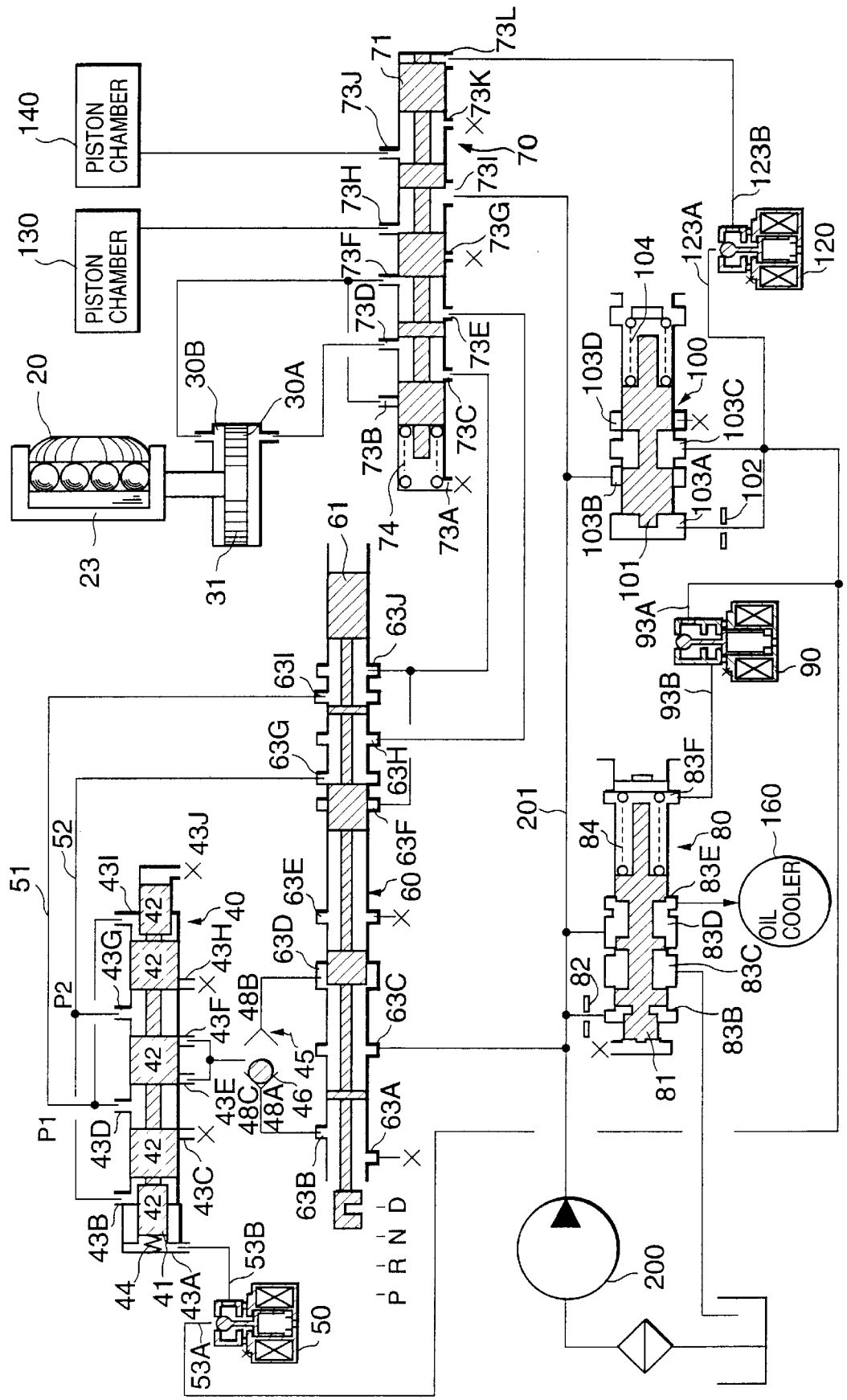
FIG. 9 is a diagram showing an oil pressure circuit of a transmission device according to a second embodiment of this invention.

Next, a second embodiment of this invention will be described referring to FIG. 9.

According to this embodiment, the position of the spring 44 of the control valve 40 is different from that of the aforesaid first embodiment. Specifically, the spring 44 is provided in on the side of the port 43A, and exerts an elastic force to act on the spool in the same direction as the signal pressure supplied to the port 43A from the control valve control solenoid 50.

According to this embodiment, when a signal pressure is not supplied, the port 43F does not open. Also, the spool 41 is maintained in a position where the port 43E is slightly open when a signal pressure power is not supplied. This is realized by setting the spring load of the spring 44 in opposition to the feedback pressure of the feedback port 43I. Due to such a setting, the differential pressure ΔP=P1–P2 is always a positive value relative to the signal pressure of the control valve control solenoid 50 as shown in FIG. 10. As a result, the relation between the signal pressure of the control valve control solenoid 50 and the differential pressure $P_{INC}$–$P_{DEC}$ of the oil chambers 30B, 30A is as shown in FIG. 11. Specifically, the differential pressure $P_{INC}$–$P_{DEC}$ remains positive or negative in all operating modes. Due to this setting, oil pressure control is still easier.

Further, when the duty ratio of the control valve control solenoid 50 is 0, the transmission is in the neutral state. It is therefore easy to maintain the neutral state, and when the duty ratio is 0, there is no scatter in the output signal. Oil pressure vibration is unlikely to occur, and no unexpected forward or reverse force acts on the vehicle in the neutral position.

Conversely, if the port 43E of the control valve 40 is slightly opened, in the neutral state, a weak load acts on the vehicle in the travel direction in the forward range D and reverse range R of the complex mode. This is even more desirable for preventing the vehicle from reacting unexpectedly.

The embodiments of this invention in which an exclusive property or privilege is claimed are defined as follows:

1. A non-finite speed change ratio transmission device for a vehicle, comprising:

a toroidal type continuously variable transmission which transmits a rotation force via a power roller gripped between an input disk and an output disk at a continuously varying speed change ratio according to a gyration angle change of said power roller in response to a differential pressure between a first oil chamber and a second oil chamber, a reduction gear unit for reducing a rotation torque identical to that of said input disk by a predetermined ratio, a planetary gear mechanism having an output shaft whereof the rotation direction varies according to a relation between a rotation output speed of said continuously variable transmission and a rotation output speed of said reduction gear unit, an operating mechanism for selecting one of forward motion and reverse motion of said vehicle, a direction selecting valve for supplying a first oil pressure to said first oil chamber and supplying a second oil pressure to said second oil chamber when said forward motion is selected, and supplying the second oil pressure to the first oil chamber and the first oil pressure to the second oil chamber when said reverse motion is selected, and a control valve for controlling a differential pressure between said first oil pressure and said second oil pressure.

2. A non-finite speed change ratio transmission device as defined in claim 1, wherein said control valve has a function for controlling said differential pressure so that said first oil pressure is not less than said second oil pressure.

3. A non-finite speed change ratio transmission device for a vehicle, comprising:

a toroidal type continuously variable transmission which transmits a rotation force via a power roller gripped between an input disk and an output disk at a continuously varying speed change ratio according to a gyration angle change of said power roller in response to a differential pressure between a first oil chamber and a second oil chamber, a reduction gear unit for reducing a rotation torque identical to that of said input disk by a predetermined ratio, a planetary gear mechanism comprising a sun gear joined to an output shaft of said continuously variable transmission, a planet carrier joined to an output gear of said reduction gear unit via a first clutch and a ring gear, a final output shaft joined to said output shaft of said continuously variable transmission via a second clutch, a mode selector valve for selecting either of a complex mode wherein said first clutch is engaged and said second clutch is released, and a direct mode wherein said second clutch is engaged and said first clutch is released, by operating said first and second clutch via control of oil pressure supplied thereto, an operating mechanism for selecting one of forward motion and reverse motion of said vehicle, a direction selecting valve for supplying a first oil pressure to said first oil chamber and supplying a second oil pressure to said second oil chamber when said forward motion is selected, and supplying the second oil pressure to the first oil chamber and the first oil pressure to the second oil chamber when reverse motion is selected, and a control valve for controlling a differential pressure between said first oil pressure and said second oil pressure.

4. A non-finite speed change ratio transmission device as defined in claim 3, further comprising a valve which, when said direct mode is selected, supplies said first oil pressure to said first oil chamber and supplies said second oil pressure to said second oil chamber.

5. A non-finite speed change ratio transmission device as defined in claim 4, wherein said control valve has a function for controlling said differential pressure so that said first oil pressure is not less than said second oil pressure.

* * * * *